United States Patent [19]

Kolb et al.

[11] 3,979,742

[45] *Sept. 7, 1976

[54] APPARATUS FOR GENERATING GRAPHICAL CONFIGURATIONS

[75] Inventors: Edwin R. Kolb, Chatham Township, N.J.; Robert M. Horvath, Quincy, Ill.

[73] Assignee: Harris-Intertype Corporation, Cleveland, Ohio

[ * ] Notice: The portion of the term of this patent subsequent to Nov. 7, 1991, has been disclaimed.

[22] Filed: Sept. 29, 1972

[21] Appl. No.: 293,679

[52] U.S. Cl. .......................... 340/324 AD; 315/378

[51] Int. Cl.[2] ........................................ G06K 15/20

[58] Field of Search ................ 340/324 AD; 315/19, 315/23, 378

[56] References Cited

UNITED STATES PATENTS

| | | | |
|---|---|---|---|
| 3,579,224 | 5/1971 | Griffin et al. | 340/324 AD |
| 3,579,234 | 5/1971 | Tsumura et al. | 340/324 AD |
| 3,728,711 | 4/1973 | Adkins | 340/324 AD |

*Primary Examiner*—David L. Trafton

[57] ABSTRACT

Apparatus for forming graphical configurations, such as alphanumeric characters, on a radiant energy surface, such as the face of a cathode ray tube, with an energy beam. The apparatus includes a path segment length command means which serves to provide a series of sets of coded command signals. Each set of coded command signals defines the length of an associated path segment of a path to be traced on the surface. A beam controller serves to deflect the beam to trace a predetermined scan path on the surface starting from a preselected starting location. The path includes a plurality of successive path segments which are of lengths dependent upon associated successive sets of coded command signals. These path segments alternate between being inside and outside of the area of a configuration to be formed on the surface. The beam is controlled such that it is continuously blanked while tracing the segments which are outside of the configuration area.

12 Claims, 3 Drawing Figures

APPARATUS FOR GENERATING GRAPHICAL CONFIGURATIONS

This invention relates to the art of generating graphical configurations on an energy beam responsive surface, such as the face of a cathode ray tube.

The invention is particularly applicable for use in phototypesetting in the graphic arts wherein characters are generated on the face of a cathode ray tube and then recorded on a film used for making printing plates; although, the invention is not limited thereto and may be used in various applications wherein it is desired to provide a visual display of graphical configurations, such as alphanumeric characters and the like.

Character generators known hertofore have taken many different forms. Of particular significance, with respect to the present invention, are character generators which utilize rastor scanning of a beam across the face of a cathode ray tube. As the beam traverses along a scan line on the face of the cathode ray tube it is blanked or unblanked pursuant to command signals to form image portions on the tube face. Each time the beam is unblanked an image is formed on the energy responsive surface of the tube face. The images formed may be spaced apart dots or painted strokes which, when taken together, define a pattern visually depicting a selected graphical image, such as an alphanumeric character. If the display be used in the printing industry the generated characters are recorded by exposing a light sensitive film or offset plate to the cathode ray tube, with the film being used for making a printing plate.

If the generated characters are to be recorded for making printing plates and the like, then the characters should exhibit high graphic quality, in terms of resolution and sharpness of lines, while, at the same time, the characters should be rapidly generated for maximum economy. One form of electronic character generator known today employs rastor scanning wherein the beam is caused to make linear (horizontal or vertical) sweeps across the face of the cathode ray tube starting each sweep from a reference margin line. For example, in the case of horizontal sweeps each sweep or scan commences from a vertical left side margin line and extends across a character field, with the beam being blanked and unblanked pursuant to command signals to form image elements on the face of the cathode ray tube. For each such scan line, however, the beam must make two sweeps, a character generating sweep commencing from the margin line and extending across the character field and then a return or flyback sweep before commencing the next character generating sweep. Also, the beam must be indexed parallel to the margin line by one scan at this time. For graphic arts quality, the number of scan lines is significant and, hence, character generating time is lost by the necessity for a flyback sweep an an indexing beam movement between character generating scans.

Another problem encounted with rastor scan character generators known heretofore is that character generation time is lost as the beam traverses through noncharacter areas within a character field. Consider the generation of the character "E", which has three horizontal legs. In a rastor scanning generation system the character is generated by a plurality of slices, for example, vertical slices. With respect to generating an E, each vertical slice through the three leg portions include a noncharacter segment extending downward from the upper horizontal margin line and then a character segment defined by the upper and lower boundaries of the first leg. This is followed by a second noncharacter segment between the upper and middle portions and then a character segment between the upper and lower boundaries of the middle leg. Another noncharacter segment extends from the middle leg to the lowermost leg and then a character segment is defined by the upper and lower boundaries of the lower leg. This lower leg may be followed by a noncharacter segment extending from the lower leg to the bottom of the character field before the beam flys back to the upper horizontal margin line. Typically, the movement of the rastor scan is at a constant velocity both during its pass through each character portion, as well as through each noncharacter portion. This constitutes loss of character generation time.

Accordingly, it is one object of the present invention to generate a graphical configuration, such as an alphanumeric character, with an energy beam without the requirement that the beam periodically flyback to its margin position after forming each character segment or group of segments less than that necessary to form an entire character.

It is still a further object of the present invention to provide generation of graphical images, such as alphanumeric characters, with energy beams without the requirement that the beam trace parallel scans, as in the case of the rastor scan system.

It is a still further object of the present invention to generate graphical images in such a manner that the radiant energy beam is caused to travel at a faster speed when tracing through noncharacter areas to minimize character generation time.

It is a still further object of the present invention to generate characters on an energy responsive surface by displacing a radiant energy beam through a character field in a fixed scan pattern which does not require flyback and which does not require parallel alternate scans.

It is still further object of the present invention to generate a graphical configuration, such as an alphanumeric character, by displacing a beam so as to trace a continuous spiral like path, with the beam being controlled to alternately define character forming segments of the path and noncharacter forming segments of the path, with the segments being of path lengths corresponding with associated run length command signals.

In accordance with the present invention both apparatus and method are provided for forming graphical configurations on an energy beam responsive surface. An energy beam is deflected to trace a predetermined nonlinear scan path on the energy responsive surface, starting from a given location within a character field area on the surface. A series of sets of coded command signals provide instructions for the path lengths of associated segments along the scan path. These series of sets of command signals are alternately representative of character forming segments and nonforming segments along the scan path.

In accordance with a more limited aspect of the present invention, circuitry is provided for deflecting the beam so that it traces a continuous predetermined nonlinear scan path wherein the scan path is of a spiral like configuration.

In accordance with a still further aspect of the present invention, beam speed control circuitry serves to alternate the speed of the beam movement between low and high deflection speeds in dependence upon whether the path segments are respectively inside or outside of the area of a desired configuration to be formed on the surface.

The foregoing and other objects and advantages of the invention will become more readily apparent from the following description of the preferred embodiment of the invention, as taken in conjunction with the accompanying drawings which are a part hereof and wherein.

Figure 1:
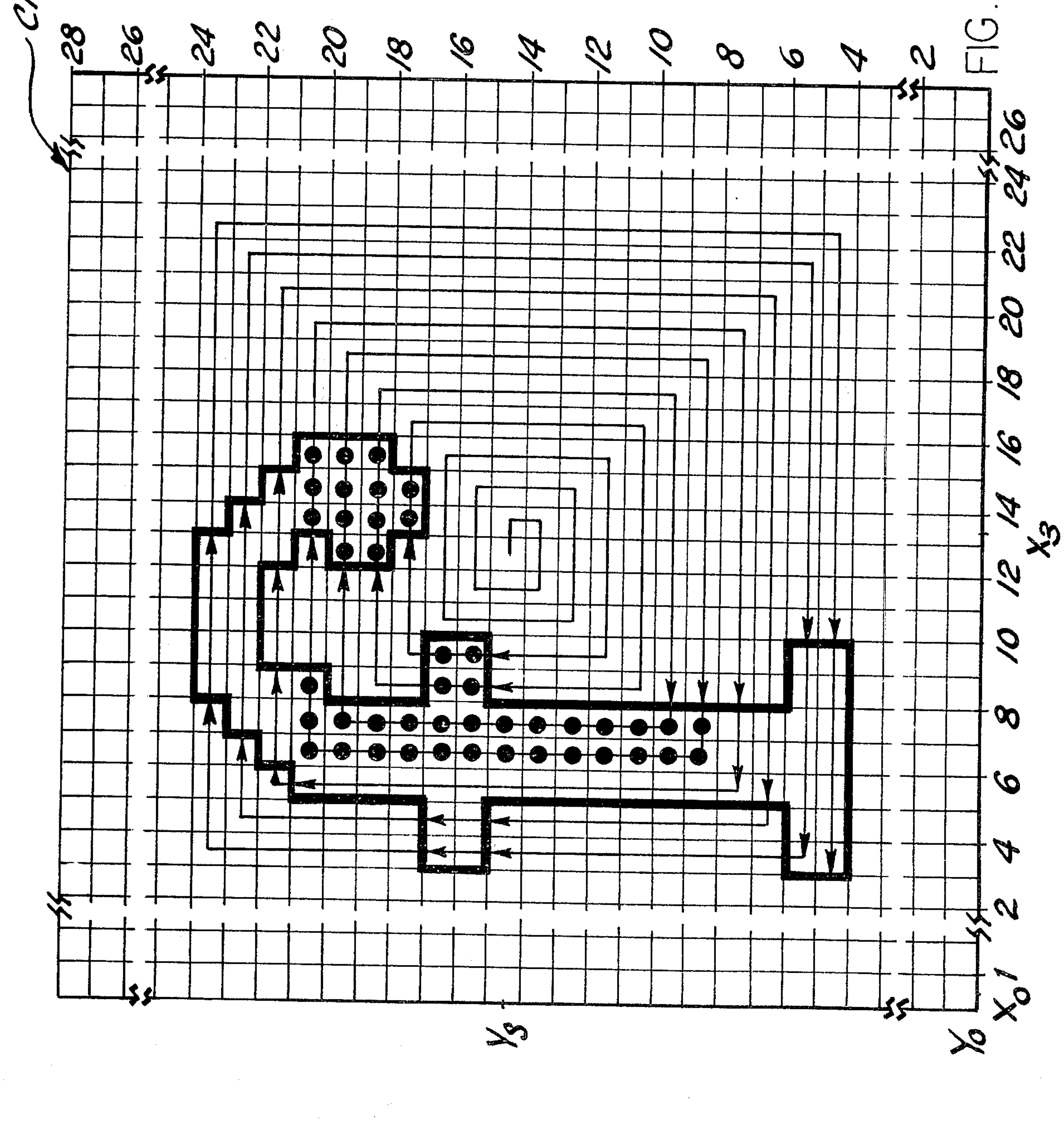
FIG. 1 shows a character "f" superimposed on a coordinate grid overlay on the face of a cathode ray tube.

Referring now to the drawings and more particularly to FIG. 1, there is shown in bold lines the outline of a character "f" to be generated on a radiant energy responsive surface, such as the face of a cathode ray tube. The area of the grid overlay shown in FIG. 1 may be considered as a character field CF on the face surface of a cathode ray tube and on which a character, such as "f", is to be generated. Of course, this character field and the size of the character "f" shown herein is greatly exaggerated in size for purposes of clarity. The character field CF is illustrated herein as being divided into 28 increments along both the horizontal or X axis and the vertical or Y axis. Typically, a cathode ray tube employed in a phototypesetting apparatus is quantitized in digital increments known as decipoints (d.p.). A decipoint is a measure of length employed in the graphic arts industry, with one decipoint being approximately equal to 1/720 of an inch.

Figure 2:
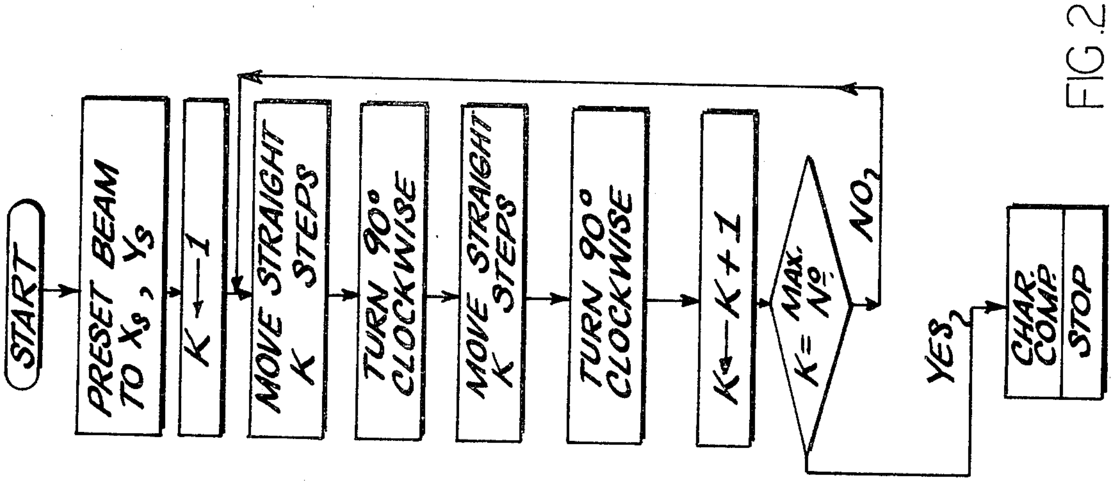
FIG. 2 is a flow chart showing the manner of operation of generating a character as shown in FIG. 1; and, FIG. 3 is a schematic-block diagram of one embodiment of circuitry which may be employed in practicing the invention.

In accordance with one aspect of the present invention, the character "f" is generated by displacing the cathode ray beam from an initial point, or starting position, defined by the coordinates $X_S$, $Y_S$ with the beam being continuously displaced along a rectangular, spiral scan path in accordance with the flow chart of FIG. 2. The beam is preset at the starting position $X_S$, $Y_S$ and is initially moved one increment, in this case one decipoint, to the right along the X axis and is then turned 90° in a clockwise direction and is displaced one increment in a downward direction. Again, the beam is turned by 90° in the clockwise direction and is displaced along the X axis. However, this movement employs two increments along the X axis. This type of movement continues until the beam has been displaced by a particular number of increments. In the generation of the character "f" the beam is initially blanked and the length of the first rectangular spiral scan segment is 39 increments, or decipoints. Thus, this first noncharacter segment of the rectangular scan path exhibits a run length of 39 increments. The beam is now in position for formation of the first character segment along the scan path. This first character segment exhibits a run length of two increments. With reference to FIG. 1, it will be noted that this segment is within character "f" and the beam is unblanked twice as it traverses through this character portion to form two dot images on the face of the cathode ray tube. Whereas the invention is described herein with respect to forming spaced apart dot images within each character forming segment, the invention may also be practiced, if desired, by painting each character forming segment with a continuously unblanked beam. Continuing with the generation of the character "f", it will be noted that the third run length segment is outside of the character and has a run length of four increments. The beam is continuously blanked as it traces the ever increasing rectangular spiral scan path. The fourth segment is within the character and exhibits a run length of two increments and, consequently, the beam is unblanked twice to form two dot images within the character area. The generation of character "f" continues in the manner described thus far with the last run length, at the foot of character "f", within the character itself and exhibiting a run length of seven increments.

From the foregoing description, it is seen that the generation of a character within the character field CF is accomplished with a single scan which starts its movement from a preset position in the character field. In the illustrated embodiment, the starting position is at the center of the character field and the scan path is in accordance with the flow chart of FIG. 2 to define a rectangular spiral scan path. It is not, however, necessary that the beam commence its movement from the center of the character field CF. The same scan path can be formed by starting, for example, at one corner of the character field, such as at coordinates $X_0$, $Y_O$ and progressively directing the beam inwardly in the opposite sense from the path shown in FIG. 1. The invention also contemplates that the scan may be other than rectangular in that, for example, the spiral scan may be a continuous curved scan starting either at the center of the character field or at one edge thereof. Also, the scan need not necessarily be a continuous path but may, for example, include concentric rectangles extending outwardly from the center of the character field or vice versa. Similarly, the scans may also be concentric circles. Other forms of nonlinear scans can be practiced wherein the scan pattern does not require the conventional rastor scan having successive scans extending parallel to each other, such as in a horizontal or vertical direction.

Referring again to FIG. 1, it will be noted that in the generation of the character "f", the run length segments are alternately inside and outside the character area. Consequently, if the first run, such as segment one, is outside of the character area there is no need to provide a special code whenever it is desired to unblank the beam, since this information is automatically provided by alternate run length instructions. In addition, the process of generating a character may be expedited if the scan speed be increased in the noncharacter areas. This information, like the blank-unblank information, is automatically provided by alternate run length instructions.

In practicing the invention, the instructions for defining the lengths of the noncharacter segments and the character segments in the scan path are preferably coded digital signals. The coding may be in straight binary notation where the decimal weight of a pattern of binary signals is representative of the actual run length of the segments, or various forms of compressed coding well known in the art may be employed. Compressed coding is particularly advantageous where many of the segments are not uniformly distributed since it minimizes storage requirements for the character generating instructions.

Figure 3:
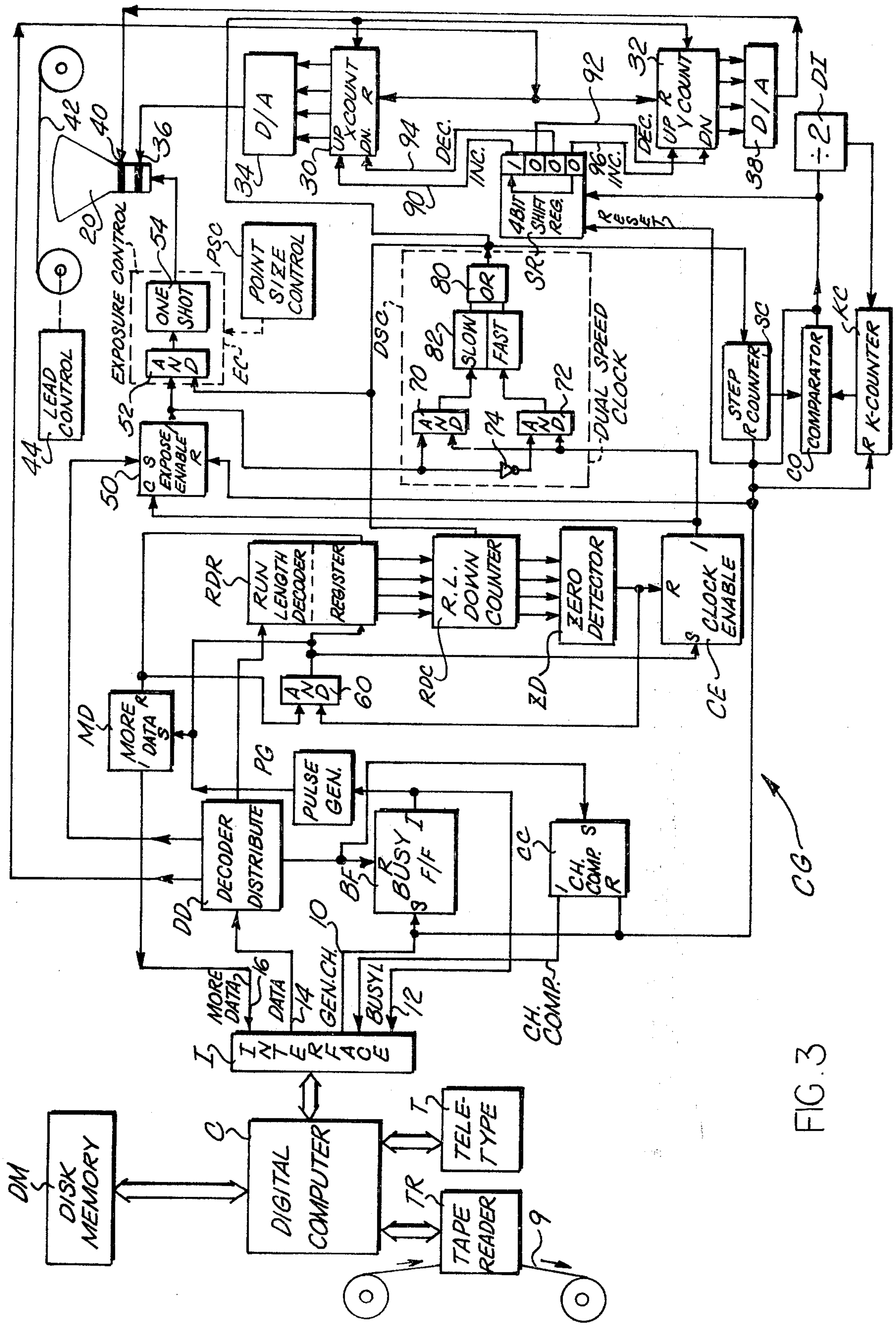

Regardless of whether the run length instructions be coded in straight binary notation or in a special compressed coding, it is contemplated that the instructions for generating each character include a plurality of sets of coded instructions which alternately define run lengths of non-character segments and character segments. The character generation routine may be ended by one of several methods. It may be ended automatically, as by having the scan generator of FIG. 3 provide a character complete signal when a maximum length straight segment has been traced, such as 20 increments. Alternatively, as shown in the flow chart of FIG. 2, the routine may be ended when K is equal to K maximum for X and Y steps. The routine could also be ended by having an end-of-character code (E.O.C.) in the data stream. If desired, the first coded instruction in a set may include instructions for positioning the cathode ray beam to a starting location; although, this could be accomplished by hard wire circuitry since the beam may be repositioned to a fixed starting location within a character field after the generation of each character. The character generating circuitry may serve to generate the character with the character field being always located at the center in the display surface of the cathode ray tube as has been done in the prior art, or the characters may be sequentially generated and positioned along a line stretching along the face of the cathode ray tube as has been done in the prior art. Either form is contemplated by the invention and for purposed of simplifying the description herein, the character generator circuitry shown in FIG. 3 and which is to be described below is with reference to generating a line of characters across the face of a cathode ray tube. In such cases, there are several character fields CF located across the face of the cathode ray tube and after the generation of each character the beam is automatically positioned to the next character field and the preset starting location therein.

Referring now to FIG. 3, there is illustrated circuitry for generating a character such as character "*f*" on the face of a cathode ray tube with a rectangular, spiral scan with the scan commencing from a preset starting position, such as in the center of the character field CF.

Reference is now made to the circuitry of FIG. 3 for generating characters in accordance with the present invention. The instructions for generating the characters may be stored on an optically coded disc, holographic store, magnetically coded disc or magnetic tape, or the like. Each group of characters of a particular style is referred to as a font, and since several fonts should be available for printing the storage medium will store the coded instructions for the characters of each of a plurality of fonts. For purposes of illustration, the fonts are stored on a disc memory DM conventionally connected to a general purpose digital computer C. The digital computer is preferably a small general purpose computer known as a mini-computer, although, if desired, larger computers may be used. One computer which may be used in conjunction with this invention is known as PDP-11 manufactured by Digital Equipment Corporation. In the PDP-11 computer, the central processing unit communicates with the memory therein as well as to the disc memory, a tape reader and a teletype and other equipment through a common line.

Input to the digital computer C may be obtained from a tape reader TR, or from a teletype T. The tape reader is employed if instructions are to be read from a tape 9 commanding the particular characters to be generated. Alternatively, this may be accomplished directly with the teletype T. Whether a tape reader or a teletype be employed, the first instructions to the computer may include information as to which font or fonts are to be employed in generating the characters making up a text to be generated on the face of a cathode ray tube. The digital computer then communicates with the disc memory DM through the common line to transfer into the memory within the computer the instructions for generating each of the characters within the selected font or fonts. As the computer receives character command signals from the tape reader TR or teletype T it communicates through the common line with the mass memory to obtain the instructions for generating the character commanded.

In generating each character, the digital computer C communicates with the character generator CG through a suitable interface I. The interface I may be of conventional design and serves to commence character generation by providing a pulse (such as a positive or binary "1" pulse) on its generate character output circuit 10, providing the busy input 12 does not carry a busy signal, such as in the form of a steady state binary "1" signal. As will be explained in greater detail hereinafter, the character generator provides a busy signal during character generation and, hence, the generate character output circuit 10 will not then provide a pulse to start generation of another character. Also, interface I is designed so that its data output circuit 14 provides data flow to the character generator only when data is requested. Data is requested by the character generator by placing a high, or binary "1", signal level on its more data circuit leading to the more data input circuit 16 of interface I.

The generator serves to provide a busy signal to the interface circuit I when it is generating a character by means of a busy flip-flop BF. The generate character pulse on output circuit 10 from the interface is applied to the set input S of the flip-flop so that the output circuit of flip-flop changes state to carry a binary "1" or busy signal. This signal is applied to the busy input circuit 12 of the interface circuit I. Also, the generate character pulse is applied to the reset input of a character complete flip-flop CC so that its output circuit to interface I is lowered, or carries a binary "0" signal. The busy flip-flop BF is reset to lower its busy line, i.e. place a binary "0" signal on its output circuit, whenever the character generator has completed generating a character. In the disclosed embodiment, a character complete flip-flop CC is set and the busy flip-flop BF is reset whenever a decoder distributor circuit DD decodes and end-of-character instruction from the data stream applied to it from the data output circuit 14 of the interface circuit. Whenever the decoder distributor circuit DD detects such an end-of-character code it applies a binary "1" signal to the set input S of flip-flop CC and to the reset input R of the flip-flop BF. Whenever the character generator desires more data it raises its more data line connected to input circuit 16 of the interface circuit I. This may be accomplished in various manners, and, for example, as shown in FIG. 3, a more data RS flip-flop MD is provided for this purpose. When the busy flip-flop is initially actuated by a generate character pulse its output circuit provides a binary "1" steady state signal. This may be converted to a binary "1" pulse by a suitable pulse generator PG, with the pulse then being applied to the set input S of the more data flip-flop MD. This will raise the more data output line taken from the output of flip-flop MD. During character generation, however, there may be times during which the data flow should be stopped and this may be accomplished by applying a reset pulse to the reset input R of flip-flop MD.

The data stream applied to the decoder distributor DD will initially include information as to the start position for the beam of cathode ray tube 20. As previously discussed with reference to FIG. 1, a character "*f*" is generated on the face of a cathode ray tube within a character field CF by a spiral rectangular path which starts at the center of the field, at coordinates $X_S$, $Y_S$. Alternatively, the character may be started from a position at one side of the character field, such as at position $X_O$, $Y_O$, with the spiral rectangular path being in the opposite direction and traversing in ever decreasing spiral turns. In the example being described herein, it is assumed that the preset or starting position is at the center of the character field at coordinates $X_S$, $Y_S$. It is contemplated that the characters will be written sequentially along a line extending across the face of tube 20. Initially, characters are generated at the left side and progressively across the line to the right side of the display surface. For purposes of simplification, no character positioning circuitry is illustrated herein and various circuits well known in the art may be used for this purpose. As each character is positioned it is contemplated that there will be a character field area corresponding with the character field CF as shown in FIG. 1. The beam of the cathode ray tube may be initially positioned to the center location $X_S$, $Y_S$ by presetting an X counter and a Y counter so that the two counters respectively provide digital counts or representations of the coordinates $X_S$,$Y_S$. These counts which are digital representations are converted by digital-to-analog converters and applied to the X deflection circuitry and the Y deflection circuitry so as to position the beam.

Referring now to FIG. 3, once a character is to be generated the control program, upon receiving a character complete signal, will examine the input program to see what character is next. It transfers this sub-routine (or part of it) to the computer's memory, provides the interface with the memory address, and then the control program generates the generate character command signal. This may be coded information which is then decoded so that the decoder provides a reset pulse to an X counter 30 and a Y counter 32. Whenever this pulse is received by the counters they are reset so that the digital representations in the counters are representative of the coordinates $X_S$, $Y_S$. The X count registered by the X counter 30 is converted by a digital-to-analog converter 34 and applied to the X deflection coil 36, through a suitable analog amplifier (not shown) to cause the cathode ray beam to be positioned along the X direction, as required. Similarly, the digital representations provided by the Y counter 32 are converted by a digital-to-analog converter 38 and suitably amplified by an analog amplifier (not shown) and applied to the Y deflection coil 40. This will preset the beam to the starting coordinates $X_S$, $Y_S$ in the character field CF on the face of a cathode ray tube 20. Since it is contemplated that the character generator be used in conjunction with phototypesetting, the images formed on the face of the cathode ray tube are recorded on a suitable light sensitive film 42, in a known manner, with the film being driven, as with a leading control 44, in a known manner.

With the beam of the cathode ray tube positioned at the start position defined by coordinates $X_s$, $Y_S$, information in the data stream is provided as to whether the beam should be initially on or off during the first run length segment of the spiral rectangular path. In the case of generating the character "*f*" shown in FIG. 1, the first run length is 39 increments with the beam being continuously blanked. This is followed by a second run length within the character during which the beam is unblanked twice. The beam moves along the spiral rectangular path in accordance with the prevailing count of counters 30 and 32. As will be described in greater detail hereinafter, these counters are controlled by a clock source and the digital representations provided by the counters are changed at a frequency synchronized to the clock source. The counting is such that the beam steps up along the spiral rectangular path in equal increments in either the X direction or the Y direction, as is indicated by the grid superimposed on the character field CF of FIG. 1. When the beam is unblanked within a character area it provides images in the form of incremently spaced dots. If desired, the unblanking within the character area may provide a continuous trace or painted image, although, for purposes of describing the invention herein it will be considered that when the beam is unblanked an image dot will be formed for each incremental deflection in either the X direction or the Y direction.

Turning now to circuitry of FIG. 3, the information provided in data stream is decoded to indicated that the beam should be unblanked or that it should be blanked. If the beam is to be blanked, as in the case of the first run length in generating character "*f*", then a binary "0" signal is applied by the decoder distributor to the set input S of an exposeenable flip-flop 50. This will not cause the flip-flop to change state and, consequently, its output circuit carries a binary "0" signal indicating that the first run length segment requires a blanked beam. If the first run length segment is to be an unblanked beam then a binary "1" signal would be applied by the decoder distributor DD to the set input of flip-flop 50 so that its output circuit would carry a binary "1" signal.

Depending on the state of the output circuit of the expose-enable flip-flop 50, an expose control circuit EC will operate upon the intensity controls of the cathode ray tube to either turn the beam on or off. Since it is desired that image dots be formed instead of a continuous trace, the exposure control circuitry should include means to provide this function. Various circuits may be used; although, for purposes of simplification the expose control EC, as shown in FIG. 3, includes an AND gate 52 which is enabled whenever the expose-enable flip-flop 50 provides a binary "1" signal on its output circuit indicative that the beam should be unblanked. This permits clock pulses from a dual speed clock DSC to be passed by the AND gate 52 to control the exposure of the cathode ray beam in synchronism with counters 30 and 32, which also receive clock pulses from this clock. If desired, the clock pulses passed by AND gate 52 may be shaped and have a time duration for a specific image dot size, as with the use of a one-shot multivibrator circuit 54 interposed between the AND gate and the intensity control of the cathode ray tube. A point size control, well known in the art, may be used to operate upon the exposure control circuit EC to vary the distance between the image dots so as to vary the point size of generated characters.

In the generation of character "*f*", the character generating circuit has thus far been conditioned so that the beam is positioned at coordinates $X_S$, $Y_S$ and the beam is blanked for the first run length segment. The decoder distributor DD will now route the first run length in the form of coded digital signals to a run length decoder register RDR. Once sufficient data has been received to decode a first run length, i.e. in this case a run length of 39 increments, the count is then loaded into a run length down counter RDC. This may be accomplished in various ways and, for example, as shown in FIG. 3, once the decoder register RDR is loaded sufficient to decode the first run length it provides an output signal pulse which may be applied to one input of an AND gate 60. This gate is enabled if a zero detector ZD has detected a zero count in the run length down counter RDC. Since this is the condition existing after completing each run length, the zero detector will provide an output signal, for example a binary "1" signal, to enable AND gate 60. With AND gate 60 being enable by the zero detector ZD and receiving a signal from the decoder register RDR indicative that it has decoded the first length, the AND gate 60 now provides an output pulse to actuate the decoder register to transfer its count to load the run length down counter RDC. In the example being given, when the decoder register became loaded it also signalled this condition by applying a binary "1" signal to reset the more data flip-flop MD so as to lower the more data line and, thereby, stop data flow to the decoder register until it transfers the just decoded run length segment count to the run length down counter.

As AND gate 60 actuates the decoder register RDR to transfer the run length count for the first segment to the run length down counter RDC, the AND gate also actuates the set input of a clock enable flip-flop CE. This flip-flop serves to actuate the dual speed clock DSC so that it, in turn, applies clock pulses to the run length down counter. Once the run length counter has counted to zero, i.e. has counted 39 clock pulses in the case of the first run length segment in generating character "*f*", this condition is detected by the zero detector ZD which applies a reset pulse to the reset input of the clock enable circuit CE and thereby stop further pulses from being provided by the dual speed clock DSC. Also, at the time decoded run length count is transferred from the decoder register to the run length down count, RDC, AND gate 60 applies a pulse to the set input S of the more data flip-flop MD so that the coded information for the next run length segment in distributed by decoder distributor DD to the run length decoder RDR to be decoded during the time that the run length down counter RDC is counting down the count of the previously decoded run length segment.

The speed of stepping the beam in increments along the scan path is synchronized to the clock frequency. As will be noted from FIG. 1, the run length segments are alternately outside of a character area and inside of a character area. As it is desirable to minimize the time to generate a character, the beam is caused to move at a faster speed when being incremented along a run length segment outside of the character area. As the character is being generated, circuitry serves to increase the clock frequency from a slow rate to a fast rate whenever the run length segment is outside of the character area. This is accomplished with the circuitry discussed below.

When a run length segment is counted down to zero by the run length down counter, the zero detector ZD resets the clock enabling flip-flop CE so that its output circuit carries a binary "0" signal until another trigger pulse is applied to the set input of the flip-flop. Whenever the clock enable flip-flop CE has its output circuit in a binary "0" condition, the dual speed clock is rendered inoperative so that clock pulses are not passed either to the run length down counter of the X counter or the Y counter. This binary "0" condition of the clock enable flip-flop is considered as a complement signal and, as a negative going signal, is usded to trigger input circuit C of the expose enable flip-flop 50 to cause the flip-flop to change state. Consequently, the output circuit of the expose enable flip-flop will alternately carry a positive or binary "1" signal and a ground or binary "0" signal. Whenever the output circuit of the expose enable flip-flop is a binary "1" state it commands that the beam be unblanked and, hence, that the clock DSC operate at its slow speed. Conversely, whenever the output circuit of expose enable flip-flop 50 carries a binary "0" signal it commands that the beam be blanked and, hence, that the dual speed clock DSC operate in its fast mode.

The dual speed clock may take various forms and, for purposes of illustration herein, the clock, as shown in FIG. 3, employs a pair of AND gate 70 and 72 which are enabled by a binary "1" signal carried by the output circuit of the clock enable flip-flop CE. If the expose enable flip-flop 50 commands that the beam be blanked then its output circuit carries a binary "0" signal. This is inverted by an inverter 74 so as to apply a second binary "1" signal to AND gate 72. AND gate 72 will now actuate the fast portion 76 so that high frequency clock pulses are provided through and OR gate 80. However, when the expose enable flip-flop 50 commands that the beam be unblankded its output circuit carries a binary "1" signal, which is applied to AND gate 70. This will cause the slow portion 82 of the clock to operate and the slow clock pulses are passed through OR gate 80. Various other forms of logically gated dual speed clocks may be provided for this purpose.

Referring now to FIG. 1, it will be noted that the spiral rectangular path taken by the beam starts at the coordinate position $X_S$, $Y_S$ at the center of the character field CF. The beam initially moves in a horizontal direction for one step or increment and then the beam is turned by 90° in a clockwise direction and moves in a downward direction along the Y axis by one step. At this point, the beam again turns by 90° in a clockwise direction but moves two steps along the X axis and then turns by 90° and moves upward along the Y axis for two steps. The beam then makes another 90° turn in a clockwise direction and moves three steps along the X axis, and so forth. A flow chart of this operation is shown in FIG. 2.

This operation is implemented by the circuitry in FIG. 3, including a step counter SC, a comparator CO, a K-counter KC, a divide by two circuit DI, and a four bit shift register SR for controlling the operation of the X counter 30 and Y counter 32. When the generate character pulse is applied to the busy flip-flop BF to commence generation of a character, it also serves as a reset pulse to reset the step counter SC, the four bit register SR, the expose-enable flip-flop 50 and to preset the K-counter KC to a count representative of decimal No. 1. This latter function may be accomplished by applying the pulse to the reset input of the K-counter KC which is prewired so that upon receipt of a reset pulse the counter indexes to a count representative of a decimal No. 1.

When generating character "*f*" (see FIGS. 1 and 2), the first pulse for the first run length segment is obtained from the dual speed clock DSC operating in its fast mode. The first clock pulse updates the step counter SC by one count. Since both the step counter SC and the K-counter KC have the same pulse count, comparator CO provides an output pulse. This shift register has four output circuits 90, 92, 94 and 96 which sequentially carry a binary "1" signal. When the first stage carries a binary "1" signal, output circuit 90 carries a binary "1" signal which is applied as an enabling signal to the up input of the up-down counter 30. Consequently, the first pulse count is counted by counter 30 which then carries a digital representation of plus 1 increment in the X direction. This is converted by the digital-to-analog converter 34 which acts upon the X deflection coil 36 so that the beam moves one step in the positive direction along the X axis. The output signal from comparator CO actuates the shift register to shift the binary "1" signal to the next stage and is applied to the reset input of the step counter SC to reset the counter to zero.

The next clock pulse from the dual speed clock DSC causes the step counter to again count to one. Now only output circuit 92 of the shift register carries a binary "1" signal and this is applied to the down input of the up-down Y counter 32. Consequently, the down counter is decremented by one count by the second clock pulse. The digital representation of this count is converted by the digital-to-analog converter 38 to cause the deflection coil 40 to move the beam one step downwardly along the Y axis. The divide by two circuit DI has now received two pulses and consequently its output circuit now applies a pulse to the K-counter KC so that this counter now stores a count representative of decimal No. 2. The divide by two circuit DI may take the form of a simple flip-flop or one stage binary counter so that it provides a pulse each time its input circuit has received two pulses. Also, this second clock pulse updates the K-counter by one count and comparator CO actuates the shift register to shift the binary "1" signal to the next stage and resets the step counter SC to zero.

The third count pulse from the dual speed clock DSC will cause step counter SC to count one pulse. However, comparator CO will not provide an output pulse since the step counter SC has a count of one, whereas the K-counter KC has a count of two. The shift register was conditioned in the previous operation so that only its output circuit 94 carries a binary "1" signal to enable the down input of the X counter. Thus, the third clock pulse decreases the count in the X counter by one count and the beam is moved in a negative direction along the X axis for one step. The fourth clock pulse applied to the step counter SC causes the beam to move one more step in the negative direction along the X axis. Also, the step counter will now carry a total count of two. This is the same count as in the K-counter KC and, hence, the comparator CO will actuate the shift register so that now a binary "1" signal is carried only by output circuit 96.

During the fifth and sixth clock pulses, the up input of the Y counter is enabled so the Y counter will count these two clock pulses in a positive or upward direction and, hence, the beam will move upward by two steps. When these two pulses have been counted, the comparator CO will again note that the step counter SC and the K-counter KC each have a count of two and will actuate the shift register SR so that for the next clock pulse only output circuit 90 of the four bit shift register carries a binary "1" signal to enable the up input of the X counter 30. This operation continues as shown in the flow chart of FIG. 2 and as illustrated graphically in FIG. 1 for a total count of 39 clock pulses for the first run length segment.

The clock operates in its fast mode during the first run length segment, which is outside of the character area. Once 39 clock pulses have been counted, the run length down counter has counted down to a zero count. This is detected by the zero detector ZD which resets the clock enable flip-flop CE to cause the dual speed clock DSC to cease operation. The clock enable flip-flop also causes the expose enable flip-flop 50 to change states so that its output circuit now carries a binary "1" signal commanding that the beam be unblanked for the next run length segment. This command actuates the exposure control circuit EC to unblank the beam in synchronism with the clock frequency at each step. The dual speed clock will now be actuated to its slow mode and once the count of the second run length has been loaded from the decoder register into the run length down counter RDC, the clock enable flip-flop CE will be set and enable the dual speed clock DS to operate in its slow mode. The second run length segment is within the character and includes only two steps in the positive Y direction.

With reference to FIGS. 1 and 3, it will be noted that as the first run length is being completed, the K counter has been set to six. However, upon the completion of the first run length only three clock pulses of the second group of six clock pulses have been counted by the step counter SC. Consequently, on the commencement of the second run length segment the status of the four bit shift register SR is that only its output circuit 96 carries a binary "1" signal to enable the up input of the Y counter 32. The next three clock pulses, which include two clock pulses for run length segment No. 2, as well as the first clock pulse for run length segment No. 3, must be counted before the four bit shift register is actuated so that only its output circuit 90 carries a binary "1" signal to enable the up input of the X counter. This operation is also seen from an examination of the flow chart of FIG 2.

The last run length in generating character "*f*" is the 39th run length segment and this is within the character. The coded signals representative of the last run length are followed by additional coded signals representative of end-of-character (E.O.C.). This is detected by the decoder distributor DD to set the character complete flip-flop CC, to raise its output circuit to interface I, and to reset the busy flip-flop BF, to remove the busy signal applied to the busy line input circuit 12 of interface I. The character generator is now in condition to receive the character generating information for the next character. Once a generate character pulse is received from the generate character output circuit of the interface, this pulse serves to set the busy flip-flop BF and reset the character complete flip-flop CC, the expose enable flip-flop 50, the step counter SC, the K counter KC and the four bit shift register SR to the status as illustrated in FIG. 3.

Whereas the invention has been described with respect to a preferred embodiment it is to be appeciated that various modifications may be made without departing from the spirit and scope of the present invention defined by the appended claims.

What is claimed is:

1. Apparatus for forming graphical configurations on an energy responsive surface with an energy beam and comprising: path segment length command means including means for providing a series of sets coded command signals with each said set of coded command signals defining the length of an associated path segment of a path to be traced on said surface by said beam; beam control means including means for controlling deflection of said beam to trace a nonlinear predetermined scan path on said energy responsive surface from a preselected starting location thereon, said path having at least one portion which at least partially circumscribes a second portion of said path, said path being comprised of a plurality of successive path segments of length dependent upon associated successive said sets of coded command signals such that alternate ones of said segments are inside and outside of the surface area of a configuration to be formed on said surface, and beam exposure means for alternately blanking and unblanking of said beam such that said beam is blanked while tracing a said outside segment and is unblanked while tracing a said inside segment.

2. Apparatus as set forth in claim 1 wherein said beam exposure control means includes circuit means responsive to alternate said sets of coded command signals for alternately blanking and unblanking said beam as it traces successive said path segments.

3. Apparatus as set forth in claim 1 wherein each said set of coded command signals is representative of a number of preset beam displacement increments along said scan path for an associated said path segment.

4. Apparatus as set forth in claim 3 wherein said beam control means includes means for incrementally deflecting said beam by said preset increments for a number of increments for each said path segment dependent upon the associated said set of coded command signals.

5. Apparatus as set forth in claim 3 wherein said path segment length command means includes counting means for counting clock pulses for each path segment until the number of counted clock pulses corresponds with the representation of an associated said set of coded command signals, and said beam control means includes means for incrementally deflecting said beam along said path by a number of said preset increments in dependence upon the number of clock pusles counted by said counting means for said path segment.

6. Apparatus as set forth in claim 3 wherein said beam control means include means for controlling said beam to move along said path by a number of said preset increments in dependence upon the number of clock pulses applied thereto, and means for applying said clock pulses for each said path segment in dependence upon the associated said set of coded command signals.

7. Apparatus as set forth in claim 3 wherein said beam control means includes first and second reversible counter means adapted to count clock pulses provided by a clock pulse source in a forward direction or in a reverse direction; counter control means for selectively controlling said first and second counter means so that only one of said counter means is effective to count said clock pulses in a selected one of said directions in dependence upon a preselected scan path to be traversed by said beam, and beam deflection circuit means for deflecting said beam along respectively mutually perpendicular coordinate axes in dependence upon the counts registered by said first and second counter means.

8. Apparatus as set forth in claim 7 wherein said counter control means include circuit means responsive to said clock pulses for controlling said first and second counter means to count said clock pulses in such a manner that the registered counts command that said beam incrementally trace a continuous spiral, rectangular path on said surface.

9. Apparatus for forming graphical configurations on a radiant energy responsive surface with a radiant energy beam and comprising: beam deflection means for deflecting a said beam along a continuous nonlinear predetermined scan path having portions of the length thereof at least partially circumscribing other portions of the length thereof and wherein said path commences at a given location within a configuration field area on said surface; means for providing a series of sets of coded command signal with each set providing instructions as to the length of an associated path segment of said scan path and commencing from said given location such that said scan path is comprised of alternate said segments which are respectively inside the outside the surface area of a configuration to be formed on said surface; and beam exposure control means responsive to successive sets of said coded command signals for alternately blanking and unblanking said beam.

10. Apparatus for forming graphical configurations on an energy responsive surface with an energy beam and comprising: beam path control means for controlling a said beam to trace a predetermined nonlinear scan path on said surface starting from a given location thereon and continuing therefrom such that said path has at least one portion thereof which at least partially circumscribes another portion thereof; means for providing a series of sets of coded command signals with successive said sets respectively providing instructions for the lengths of successively associated segments of said scan path, said series of sets of command signals being alternately representative of configuration segments and nonconfiguration segments, and beam exposure control means for energizing said beam only as said beam traces configuration forming segments on said surface.

11. Apparatus for forming graphic configurations on a radiant energy responsive surface with a radiant energy beam and wherein:

said surface has at least one configuration field area having a given plurality of incremental areas of which at least some will be within the boundaries of a configuration to be formed on said surface, said apparatus comprising:

beam deflection means for deflecting a said beam along a single continuous nonlinear predetermined scan path which commences at a given location within said configuration field area and continues therefrom so as to pass over each said incremental surface area only once during the tracing of said single scan path;

means for providing a series of sets of coded command signals with each set providing instruction as to the length of an associated path segment of said scan path with said path segments commencing from said given location and alternately being inside and outside the surface area of a configuration to be formed on said surface;

and beam exposure control means responsive to successive sets of said coded command signals for alternately blanking and unblanking said beam.

12. Apparatus as set forth in claim 11 wherein said scan path is a rectangular spiral-like path having portions thereof which at least partially circumscribe other portions thereof.

* * * * *